April 3, 1928.  L. C. STRUENSEE  1,664,838
HAYRACK
Filed March 17, 1926   3 Sheets-Sheet 3
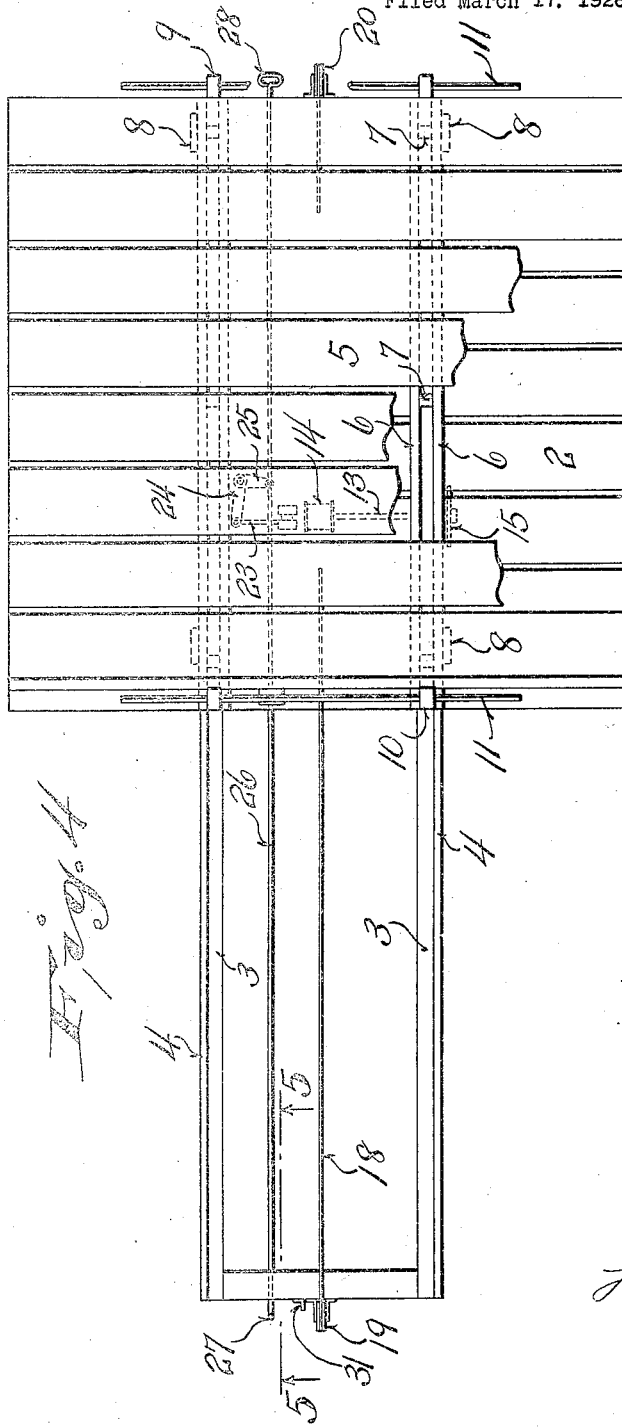
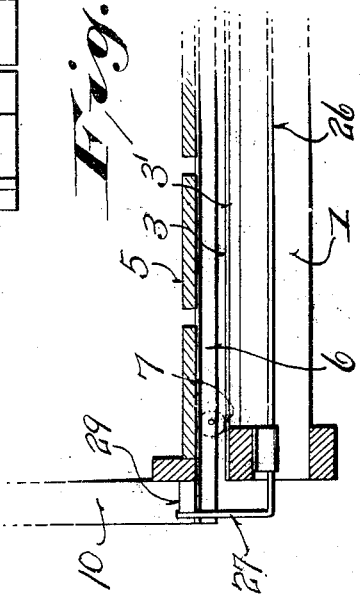
Fig.5
Inventor:
Louis C. Struensee Patented Apr. 3, 1928.

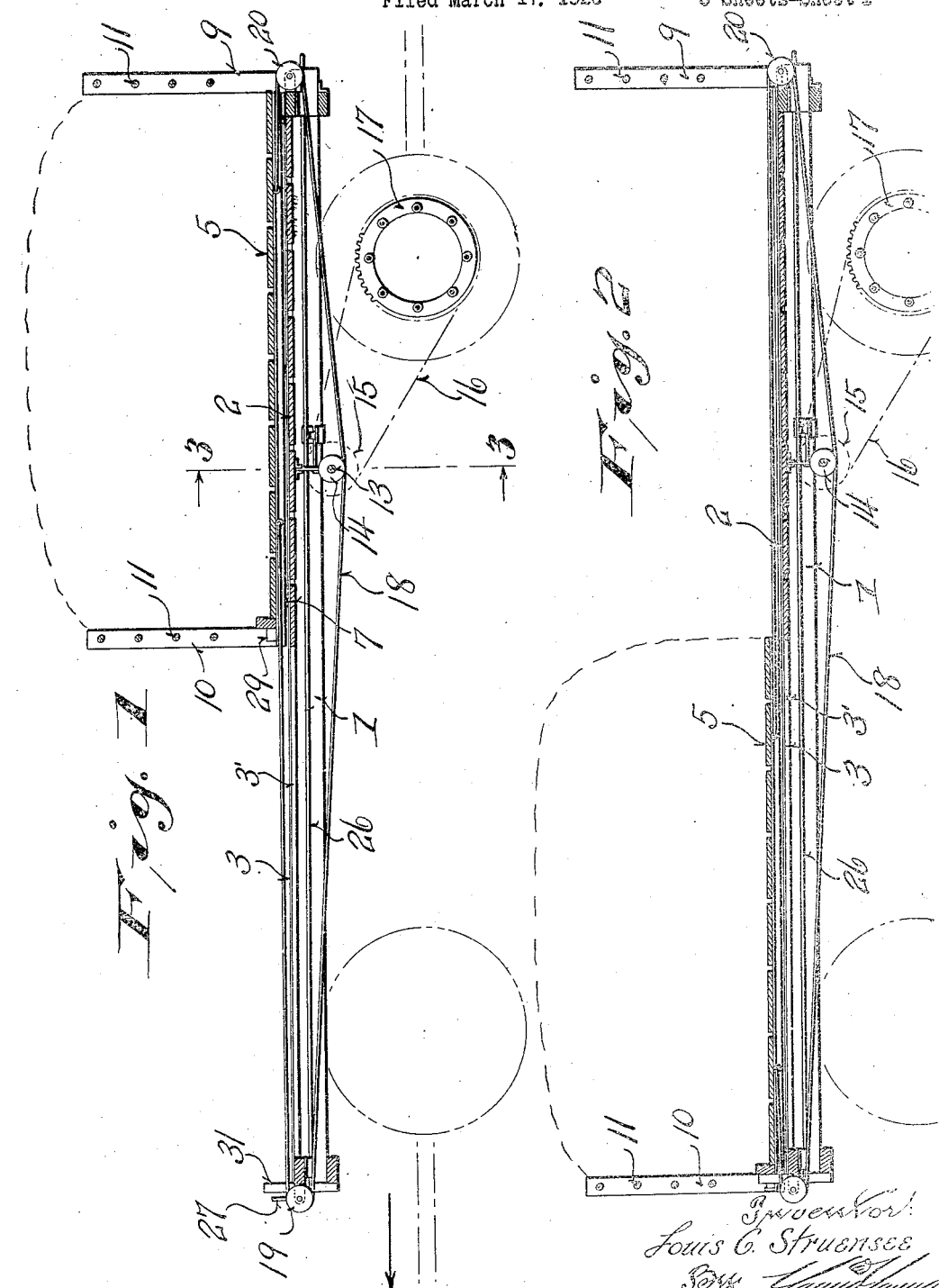

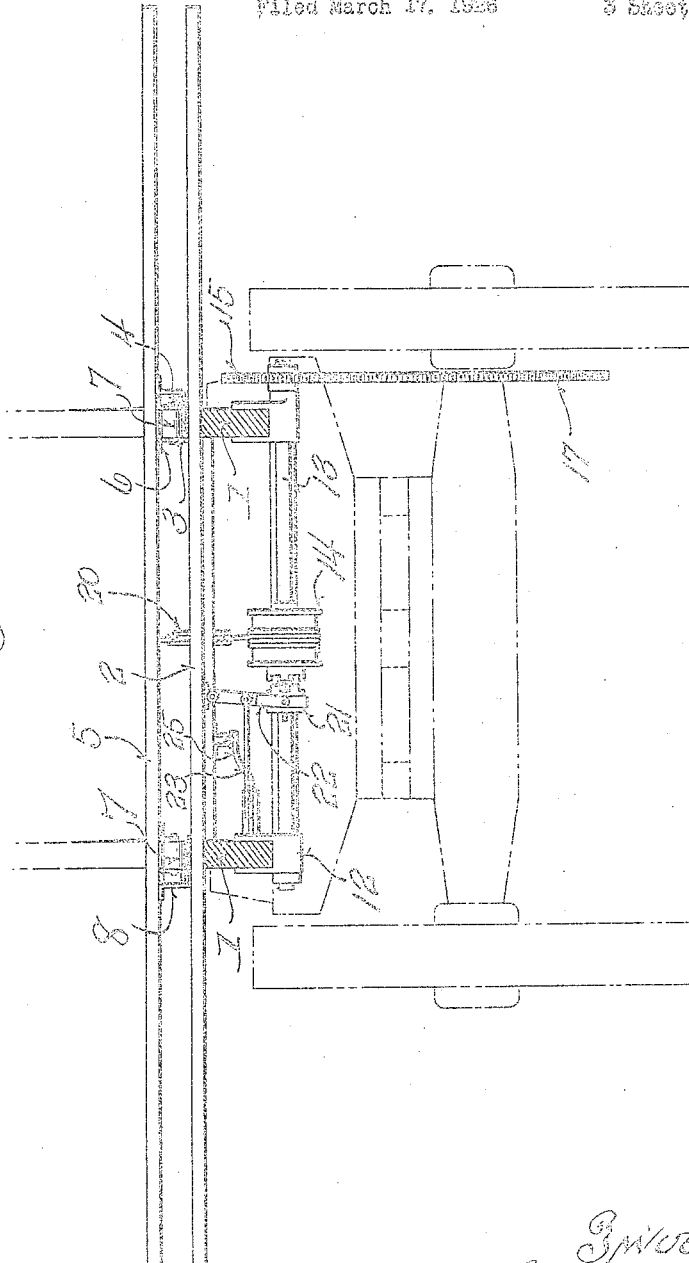

1,664,838

UNITED STATES PATENT OFFICE.

LOUIS C. STRUENSEE, OF OSHKOSH, WISCONSIN.

HAYRACK.

Application filed March 17, 1926. Serial No. 95,239.

This invention relates to hay racks.

In hay racks as heretofore constructed, it has been the usual practice to hitch the team at one end and the automatic loader at the other end, and drag the rack across the field. Obviously, the loader would dump the hay in the back of the hay rack, and it would have to be manually distributed in order to evenly load the hay rack.

This invention is designed to provide a hay rack which overcomes the above noted defects, and which may be operated to move the hay after one half has been filled to the forward portion of the hay rack, and thus allow the rear half to be filled.

Further objects are to provide a simple mechanism for accomplishing this function, and one which is driven from a wheel of the hay rack so that the effort of moving is not thrown upon the operator, to provide simple means of controlling the mechanical shifting, which means is accessible from either end of the hay rack.

An embodiment of the invention is shown in the accompanying drawings, in which:

Figure 1 is a longitudinal sectional view through the hay rack showing the movable section in its rearmost position.

Figure 2 is a corresponding view showing the movable section in its forward position.

Figure 3 is a transverse sectional view on the line 3—3 of Figure 1.

Figure 4 is a plan view of the structure shown in Figure 1.

Figure 5 is an enlarged longitudinal sectional view on the line 5—5 of Figure 4.

Referring to the drawings, it will be seen that the hay rack comprises a pair of longitudinal bed members 1 which are supported in any suitable manner from the trucks or running gear of the vehicle. These bed members carry a stationary platform 2 adjacent the rear end of the hay rack and are provided with top strips 3 over their forward edge, whose upper surface aligns with that of the stationary platform 2. A track 3 is laid upon the top strips and across the stationary platform. These tracks are each provided with outwardly projecting overhanging flanges 4.

A movable platform 5 is mounted upon pairs of angle irons 6 between which rollers 7 are mounted. These rollers travel upon the tracks 3 which are supported from the bed members. Further, the movable platform 5 is provided with a plurality of Z-shaped irons 8 which are secured to its under side and whose lower portions underlap the overhanging flanges 4 of the tracks. It is to be noted from Figure 4 that four of these Z-shaped retaining members are carried by the movable platform and are arranged at opposite sides and at the front and rear. These members prevent inadvertent detachment of the movable platform from the remaining portion of the rack.

A pair of back upright bars 9 are secured to the bed members and a pair of similar bars 10 are carried by the front portion of the movable platform 5. These front bars are secured between the angle irons 6. Preferably, transverse bars 11 are positioned between the front and rear uprights.

The bed members carry bearings 12 as may be seen from Figure 3 which support a transverse shaft 13, such shaft being provided with a winding drum 14 loosely mounted thereon. The drum shaft 13 is provided at its outer end with a sprocket wheel 15 which is connected by means of a chain 16 with a sprocket wheel 17 bolted to one of the rear wheels. The winding drum has an intermediate portion of a cable 18 wrapped therearound, and the ends of the cable are passed over front and rear rollers 19 and 20, and are attached to the movable platform 5 as shown most clearly in Figures 1 and 2. A collar 21 is slidably splined upon the shaft 13 and the adjacent faces of the collar and of the drum 14 are provided with clutch teeth. This collar is shifted by means of a forked lever 22 pivoted to the under side of the stationary platform 2. This lever is rocked laterally by means of a pitman 23 connected to one arm 24 of a bell crank lever. The other end 25 of such lever is joined to the clutch rod 26 which extends throughout the length of the hay rack. This clutch rod is provided with an upstanding handle 27 at its forward end and with a handle 28 at its rear end.

In using the apparatus, it is drawn across the field with the loader attached to its rear portion and the hay is loaded upon the movable platform 5. When this platform is filled, the operator shifts the clutch rod 26 and causes the drum 14 to be driven from the rear wheel. This shifts the movable platform forwardly from its telescopic relation to the bottom or stationary platform 2. This motion continues until the block or stop 29, see Figure 5, contacts with the upright handle 27 of the clutch rod 26. This throws the clutch open and stops further motion of the movable platform. In addition to this, it is to be noted from Figure 4 that a stop 31 is provided at the forward end of the frame and the movable platform is adapted to bear against such stop when in its forward position. When the movable platform has arrived at its forward position, the loading continues upon the stationary rear platform, and thus the entire hay rack may be automatically loaded with the hay properly distributed thereon without requiring manual distribution.

It will be seen that a very simple type of apparatus has been provided and one which may be easily operated.

It will be seen further that the construction is strong and reliable and is not likely to get out of order.

Although the invention has been described in considerable detail, such description is intended as illustrative rather than limiting as the invention may be variously embodied and as the scope of such invention is to be determined as claimed.

I claim:

A hay rack comprising a pair of longitudinally extending bed members, a stationary hay receiving platform carried by the rear part of said bed members, a track comprising a pair of rails carried by said bed members and extending across said rear platform, said rails each consisting of an angle iron having a flat bottom portion, an upturned portion and an outwardly turned portion, a movable platform provided with pairs of angle irons, rollers revolubly mounted between the pairs of angle irons and adapted to travel upon the said rails, said movable platform having a plurality of inwardly turned lips fitting over the outwardly turned portions of said rails, the upturned portions of said rails constituting guiding flanges to prevent the rollers from passing off said rails, and means for shifting said movable platform.

In testimony that I claim the foregoing I have hereunto set my hand at Oshkosh, in the county of Winnebago and State of Wisconsin.

LOUIS C. STRUENSEE.